United States Patent
Zhao et al.

(10) Patent No.: US 11,507,346 B1
(45) Date of Patent: Nov. 22, 2022

(54) INTELLIGENT TEXT AND VOICE FEEDBACK FOR VOICE ASSISTANT

(71) Applicant: GM GLOBAL TECHNOLOGY OPERATIONS LLC, Detroit, MI (US)

(72) Inventors: Xu Fang Zhao, LaSalle (CA); Gaurav Talwar, Novi, MI (US); Alaa M. Khamis, Courtice (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/509,306

(22) Filed: Oct. 25, 2021

(51) Int. Cl.
  *G06F 3/048* (2013.01)
  *G06F 3/16* (2006.01)
  *G10L 15/22* (2006.01)

(52) U.S. Cl.
  CPC .............. *G06F 3/167* (2013.01); *G10L 15/22* (2013.01); *G10L 2015/223* (2013.01)

(58) Field of Classification Search
  None
  See application file for complete search history.

(56) References Cited

U.S. PATENT DOCUMENTS

| | | | | |
|---|---|---|---|---|
| 2011/0184730 A1* | 7/2011 | LeBeau | ................... | G10L 15/30 704/235 |
| 2013/0241918 A1* | 9/2013 | Satyan | ................... | G06F 9/542 345/418 |
| 2014/0201672 A1* | 7/2014 | Borzello | ............... | G06F 3/0482 715/779 |
| 2014/0372109 A1* | 12/2014 | Iyer | ..................... | H03G 3/3089 704/225 |

* cited by examiner

*Primary Examiner* — William C Trapanese
(74) *Attorney, Agent, or Firm* — Vivacqua Crane PLLC

(57) ABSTRACT

A method for text feedback includes: receiving, by a controller, an utterance from a user; determining, by an automatic speech recognition engine of the controller, a plurality of speech recognition results based on the utterance from the user, wherein the speech recognition results include probable commands; determining, by the automatic speech recognition engine of the controller, a plurality of confidence scores for each of the plurality of speech recognition results; determining, by the controller, a text characteristic for each of the plurality of probable commands as a function of the confidence scores for each of the plurality of speech recognition results; and commanding, by the controller, a display to show text corresponding to each of the plurality of probable commands with the text characteristic determined by the controller.

20 Claims, 4 Drawing Sheets

INTELLIGENT TEXT AND VOICE FEEDBACK FOR VOICE ASSISTANT

INTRODUCTION

The present disclosure relates to vehicles and, more particularly, to intelligent text and voice feedback systems and methods for vehicle voice assistants.

Some vehicles may include speech recognition systems, which are capable of interpreting received audio speech from the user to text domains and intents. Upon receipt of the speech, the speech recognition systems can execute commands in accordance with the speech received from the user.

SUMMARY

The present disclosure describes a method for providing accentuated visual cues to the user in a crowded center stack display of a vehicle. In some situations, such as during point of interest (POI) navigation, address searches, contact name phone-calling, the list of hypotheses (i.e., speech recognition results), it is challenging and time consumer for the user to select the most appropriate option from the visual display. For instance, when users are driving, their eyes need to focus on the road, so it is challenging and time consuming to select the most appropriate option from the visual display.

In the present disclosure, a final list of hypotheses is consolidated by incorporating a priori information that reflects the most frequent recipients of phone calls/texts or the most previously visited POIs and the nearby POIs or the most frequently used control commands. After the final list of hypotheses is generated, the more likely results are accentuated by calibrated increase in font sizes of the more likely items. This is ergonomically more convenient for the users to select the desired option.

In an aspect of the present disclosure, a method for text feedback includes: receiving, by a controller, an utterance from a user; determining, by an automatic speech recognition engine of the controller, a plurality of speech recognition results based on the utterance from the user, wherein the speech recognition results are probable commands; determining, by the controller, a plurality of confidence scores for each of the plurality of speech recognition results determined by the automatic speech recognition engine; and determining, by the controller, a text characteristic for each of the plurality of probable commands as a function of the confidence scores for each of the plurality of speech recognition results; and commanding, by the controller, a display to show text corresponding to each of the plurality of probable commands with the text characteristic determined by the controller.

In an aspect of the present disclosure, the controller determines the sizes for each of the plurality of probable commands based on the confidence scores as a function of a screen size of the display.

In an aspect of the present disclosure, the controller determines the sizes for each of the plurality of probable commands based on the confidence scores as a function of a number of speech recognition results determined by the automatic speech recognition engine of the controller.

In an aspect of the present disclosure, the controller determines the sizes for each of the plurality of probable commands based on the confidence scores as function of a sum of the confidence scores for the plurality of speech recognition results. The font sizes for hypotheses depend upon the relative probability of respective results. For example, the first hypothesis may have a confidence score of 8000, and the second hypothesis may have a score 6400. Therefore, the font size of second hypothesis shall be 80% of the first one.

In an aspect of the present disclosure, the text characteristic is a text size, a text color, and/or a color contrast with respect to a background color of the screen of the display. The font sizes also depend upon the aspect ratio of the display area. For example, it will be different for Cluster, Center Stack Module Display as well as the HUD. This should be taken into consideration in addition to the background color of the screen.

In an aspect of the present disclosure, the method further includes commanding a speaker to provide voice feedback about the plurality of speech recognition results in response to determining the plurality of speech recognition results.

In an aspect of the present disclosure, the method further includes determining an audio volume of the voice feedback for each of the plurality of speech recognition results as a function of the plurality of confidence scores for each of the plurality of speech recognition results determined by the automatic speech recognition engine.

In an aspect of the present disclosure, the audio volume of the voice feedback for each of the plurality of speech recognition results is determined as a function of a maximum volume of the speaker and a maximum confidence score.

The present disclosure also describes a control system for a vehicle. In an aspect of the present disclosure, the control system includes a user interface including a display and a microphone and a controller in communication with the user interface. The controller includes an automatic recognition engine and is programmed to execute the method described above.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The present disclosure will be described in conjunction with the following figures, wherein like numerals denote like elements.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
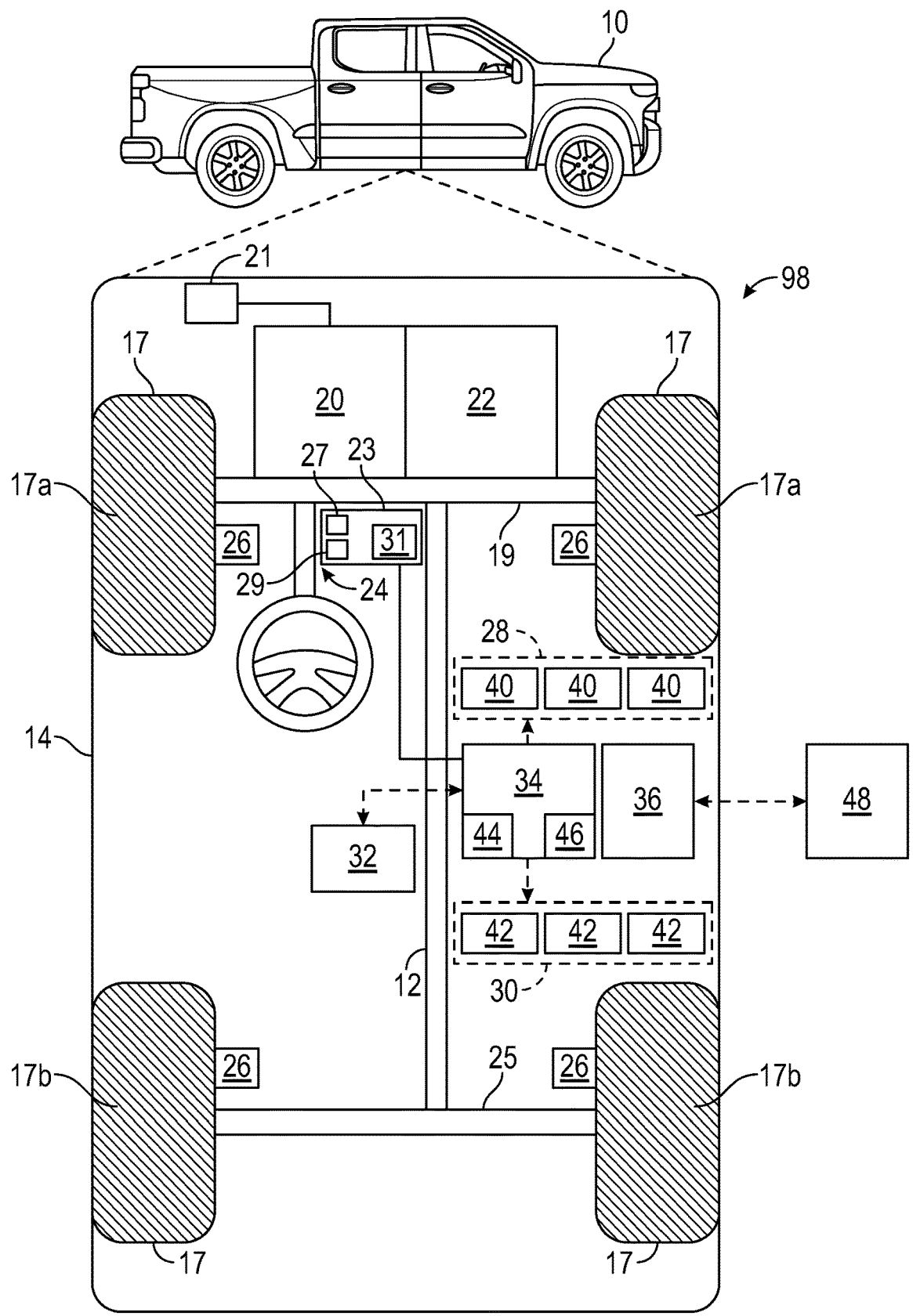
FIG. 1 is a schematic block diagram of a vehicle.

As depicted in FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

In various embodiments, the vehicle 10 may be an autonomous vehicle and a control system 98 is incorporated into the vehicle 10. The control system 98 may be simply referred to as the system. The vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., can also be used. In an exemplary embodiment, the vehicle 10 is a so-called Level Four or Level Five automation system. A Level Four system indicates "high automation", referring to the driving mode-specific performance by an automated driving system of aspects of the dynamic driving task, even if a human driver does not respond appropriately to a request to intervene. A Level Five system indicates "full automation", referring to the full-time performance by an automated driving system of aspects of the dynamic driving task under a number of roadway and environmental conditions that can be managed by a human driver.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more ground penetrating radar (GPR) sensors, one or more global positioning systems (GPS) devices, one or more cameras (e.g., optical cameras and/or thermal cameras, such as a rear camera and/or a front camera), speed sensor, steering angle sensor, ultrasonic sensors, one or more inertial measurement units (IMUs) and/or other sensors.

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The sensor system 28 includes one or more Global Positioning System (GPS) transceivers configured to detect and monitor the route data (i.e., route information). The GPS device is configured to communicate with a GPS to locate the position of the vehicle 10 in the globe. The GPS device is in electronic communication with the controller 34. Because the sensor system 28 provides data to the controller 34, the sensor system 28 and its sensors 40 are considered sources of information (or simply sources).

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The controller 34 includes at least one processor 44 and a non-transitory computer readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 is programmed with an automatic speech recognition (ASR) engine.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 may include, but is not limited to, an alarm, such as a speaker 27 to provide a sound, a haptic feedback in a vehicle seat or other object, a display 29, a microphone 31 and/or other device suitable to provide a notification to the vehicle operator of the vehicle 10. The user interface 23 is in electronic communication with the controller 34 and is configured to receive inputs by a user (e.g., vehicle operator). Accordingly, the controller 34 is configured to receive inputs from the user via the user interface 23. The user interface 23 includes the display 29 configured to display information to the user (e.g., vehicle operator or passenger) and may include one or more speakers to provide an auditable notification to the vehicle operator. The user interface 23 may be a driver information center (DIC) capable of providing information to the vehicle operator of the vehicle 10.

The communication system 36 is in communication with the controller 34 and is configured to wirelessly communicate information to and from other entities 48, such as but not limited to, other vehicles ("V2V" communication), infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs). The communication system 36 is configured to wirelessly communicate information between the vehicle 10 and another vehicle. Further, the communication system 36 is configured to wirelessly communicate information between the vehicle 10 and infrastructure or other vehicles.

Figure 2:
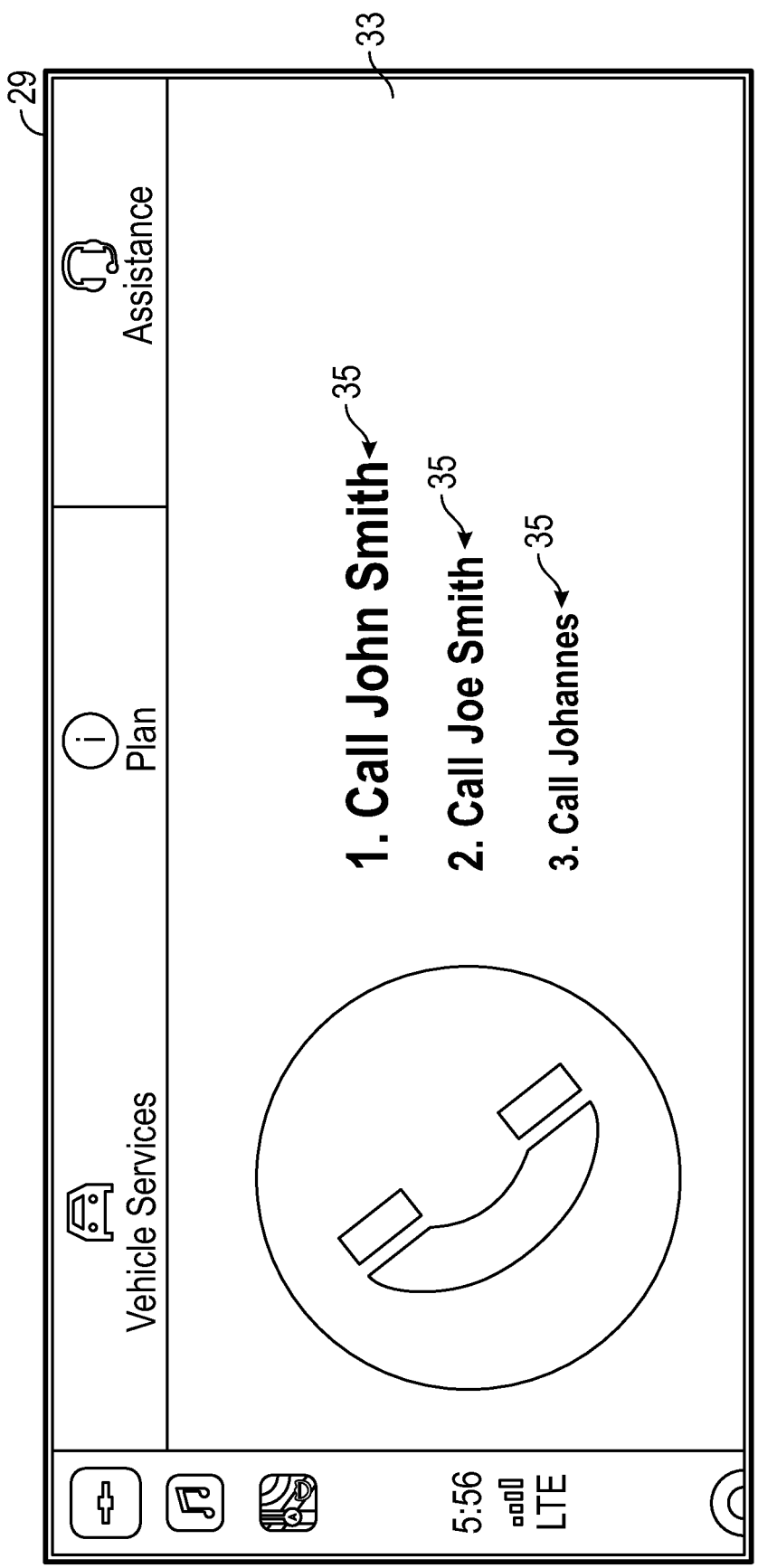
FIG. 2 is a schematic diagram of a display of the vehicle.

With reference to FIG. 2, the display 29 includes a screen 33 configured to display text 35 including different characteristics, such a text color, text size, and/or a color contrast with respect to the background color of the screen 33 of the display 29. In the present disclosure, the size of the screen 33 is referred to as the screen size.

Figure 3:
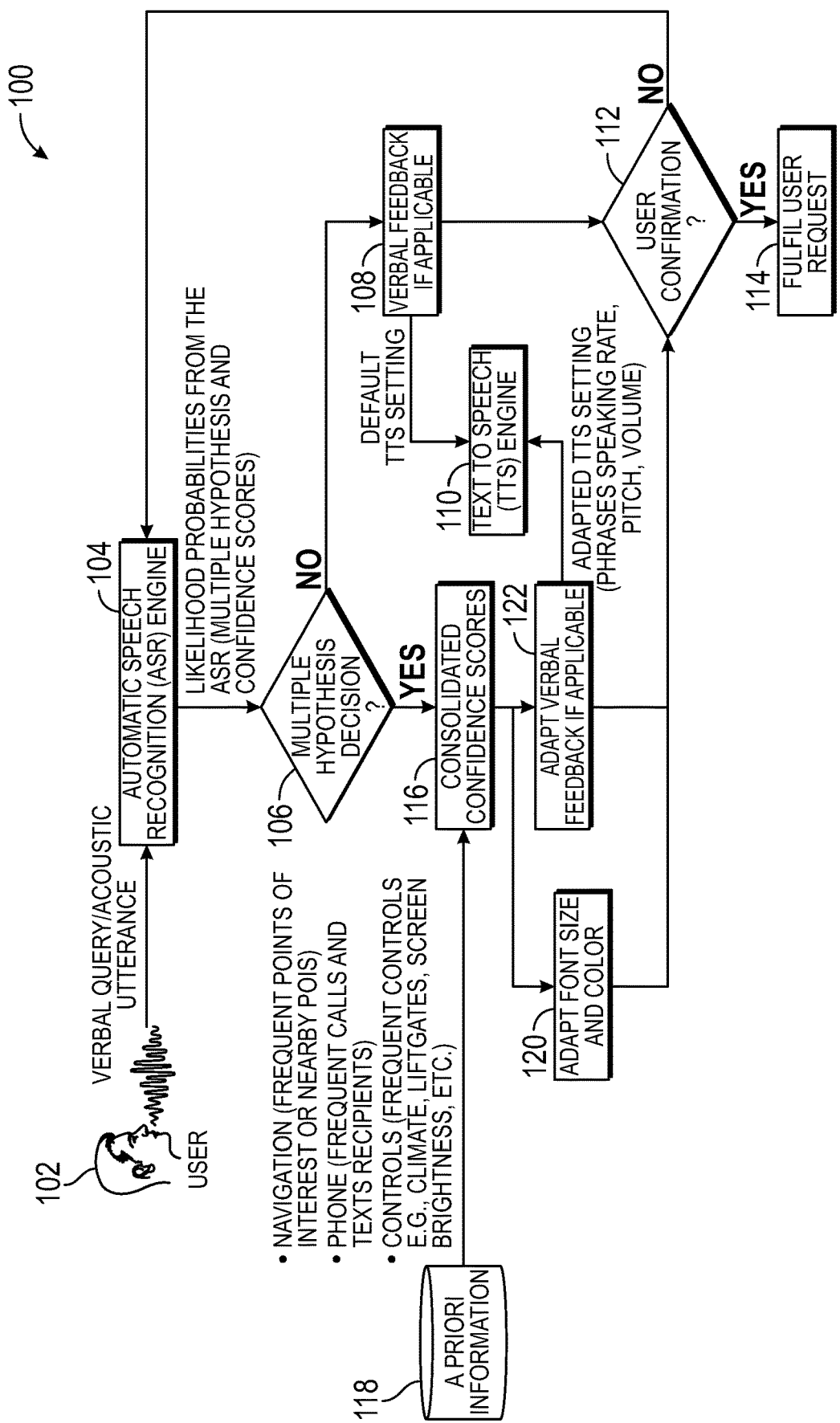
FIG. 3 is a flowchart of a method for text feedback.

With reference to FIG. 3, the controller 34 (FIG. 1) is specifically programmed to execute a method 100 for text feedback. The method 100 begins at block 102. At block 102, the user of the vehicle 10 utters a command or a query (i.e., an utterance). In other words, the user of the vehicle 10 provides the user interface a verbal query and/or an acoustic utterance. Then, the microphone 31 of the user interface 23 receives the verbal query and/or an acoustic utterance and transmits the verbal query and/or an acoustic utterance to the controller 34. The method 100 then proceeds to block 104.

At block 104, the ASR engine of the controller 34 receives and processes the verbal query and/or an acoustic utterance from the user. Subsequently, the ASR engine of the controller 34 determines a plurality of speech recognition results based on the utterance provided by the user. The speech recognition results may be probable commands and/or probable queries and may be referred to as hypotheses. Also, at block 104, the ASR engine of the controller 34 determines the confidence scores for each of the plurality of speech recognition results. The method 100 then proceeds to block 106.

At block 106, the controller 34 determines whether the ASR engine has determined multiple probable speech recognition results (i.e., hypotheses) or a single probable speech recognition result (i.e., a single hypothesis). In other words, if the controller 34 has determined that there is solely a single probable speech recognition result, then the method 100 proceeds to block 108.

At block 108, the controller 34 commands the user interface 23 to provide a verbal feedback to the user if applicable. The verbal feedback may be provided by the speaker 27 of the user interface 23 and may verbally ask the user of the vehicle 10 whether the single probable speech recognition result is correct. Then, the method 100 proceeds to blocks 110 and block 112.

At block 110, the controller 34 commands a Text to Speech (TTS) engine to use the default TTS settings. The TTS settings may include, but are not limited to, phrases speaking rate, pitch volume, among others. At block 112, the controller 34 receives confirmation from the user that the single probable speech recognition result is correct through the user interface 23. For example, the user may verbally confirm the single probable speech recognition result is correct, and the user interface 23 uses the microphone 31 to receive this verbal confirmation. If the controller 34 receives confirmation from the user that the single probable speech recognition result is correct through the user interface 23, the method 100 proceeds to block 114. At block 114, the controller 34 determines that the user request has been fulfilled. However, if the user does not confirm that that the single probable speech recognition result is correct through the user interface 23, them the method 100 returns to block 104.

Returning to block 106, if the controller 34 determines that the ASR engine has determined multiple probable speech recognition results (i.e., hypotheses), then the method 100 proceeds to block 116. At block 116, the controller 34 determines consolidated confidence scores for each of the multiple probable speech recognition results. To do so, the controller 34 accesses a database storing a priori information at block 118. The a priori information may include, but is not limited, to navigation information (e.g., frequent points of interest (POIs) or nearby POIs); phone information (e.g., frequent calls and/or text recipients), and/or controls information (frequent controls such as climate, liftgate, screen brightness, etc.). Using the a priori information, the controller 34 determines the confidence scores for each of the multiple probable speech recognition results determined by the ASR engine. The method 100 then proceeds to blocks 120 and 122. The usage history and a-priori information can be used for normalizing the initial set of hypothesis and therefore, after re-ranking of results, the font size and color will be appropriately adjusted. For example, for a coffee shop the user might request Starbucks more often than other chain outlets. Therefore, Starbucks would be the top hypothesis with bigger font and more noticeable font hue relative to other hypotheses.

At block 120, the controller 34 determines text characteristic, such as text color, text size (i.e., font size), and/or a color contrast with respect to the background color of the screen 33, based on the confidence scores for each of the multiple probable speech recognition results. For example, at block 120, the controller 34 adapts the font size and the text color of the text 35 to be shown by the display 29. Also, at block 120, the controller 34 commands the display 29 to show text corresponding to each of the multiple probable speech recognition results (e.g., probable commands) with the text characteristic determined by the controller 34. For instance, as shown in FIG. 2, the larger the confidence score of the speech recognition result, the larger the font size of the text corresponding for that particular speech recognition result will be. Also, the larger the confidence score of the speech recognition result, the larger the color contrast with respect to a background color of a screen of the display will be. As a non-limiting example, the controller 34 may determine the text size for each the speech recognition result using the following equation:

$$S_{text} = \frac{S_{screen}}{N} \times \frac{C_{score}}{\sum_{1}^{N} NBestScores/N}$$

where:
Stext is the final tuned text size;
Screen is the screen size;
N is the number of the speech recognition results;

$$\sum_{1}^{N}$$

NBestScores is the sum of confidence scores for all speech recognition results; and
Cscore is the confidence score of the target result.

The larger is the difference among confidence scores, the larger is the difference among text sizes on screens. The confidence score is associated likelihood probability for each speech recognition result. The top result will be a vivid color and font, for example, green, and bold. The top result may have slightly high contrast, if possible. The difference between the hypotheses is measured in terms of Delta Confidence. It is always relative to the TOP hypothesis. This would then guide the relative font size and hue of the hypotheses.

At block 122, the controller 34 adapts the verbal feedback if applicable. The verbal feedback is a voice feedback provided through the speaker 27 of the user interface 23. Therefore, at block 122, the controller 34 commands the speaker 27 to the voice feedback about the speech recognition results. The voice feedback may also be weighted or adapted based on the confidence score, which is based normalizations across multiple hypothesis. The following equation may be used to determine the audio volume of the voice feedback based on confidence scores and ambient noise. Larger font hypotheses have more emphasis in Speech Prompt when the information is verbally vocalized back to the user. So besides, font sizes and color contrast, speech feedback shall also be adapted.

$$V_{audio} = NBestScore/MaxScore \times MaxCSMVolume \times SNRAdjustCoeff$$

where:
Vaudio is the final tuned audio volume;
NBestScore is the confidence score of the target result;
MaxScore is the maximum value of returned confidence scores;
MaxCSMVolume is the maximum audio volume of the infotainment radio; and
SNRAdjustCoeff is the coefficient to compensate the ambient noise.

The prompt phrase of the voice feedback can be changed from really sure to sure or not sure based on confidence scores.

The method 100 then provides the TTS engine with the adapted TTS settings (e.g., phrases speaking rate, pitch, and volume). In addition to speaking rate and stress on top scoring items, the time out for speech dialogs shall also be adjusted. So that the user can timely respond to Speech Feedback suggestions. Say instead of 1000 ms the dialog could now accommodate the timeout period of 1200 ms.

Figure 4:
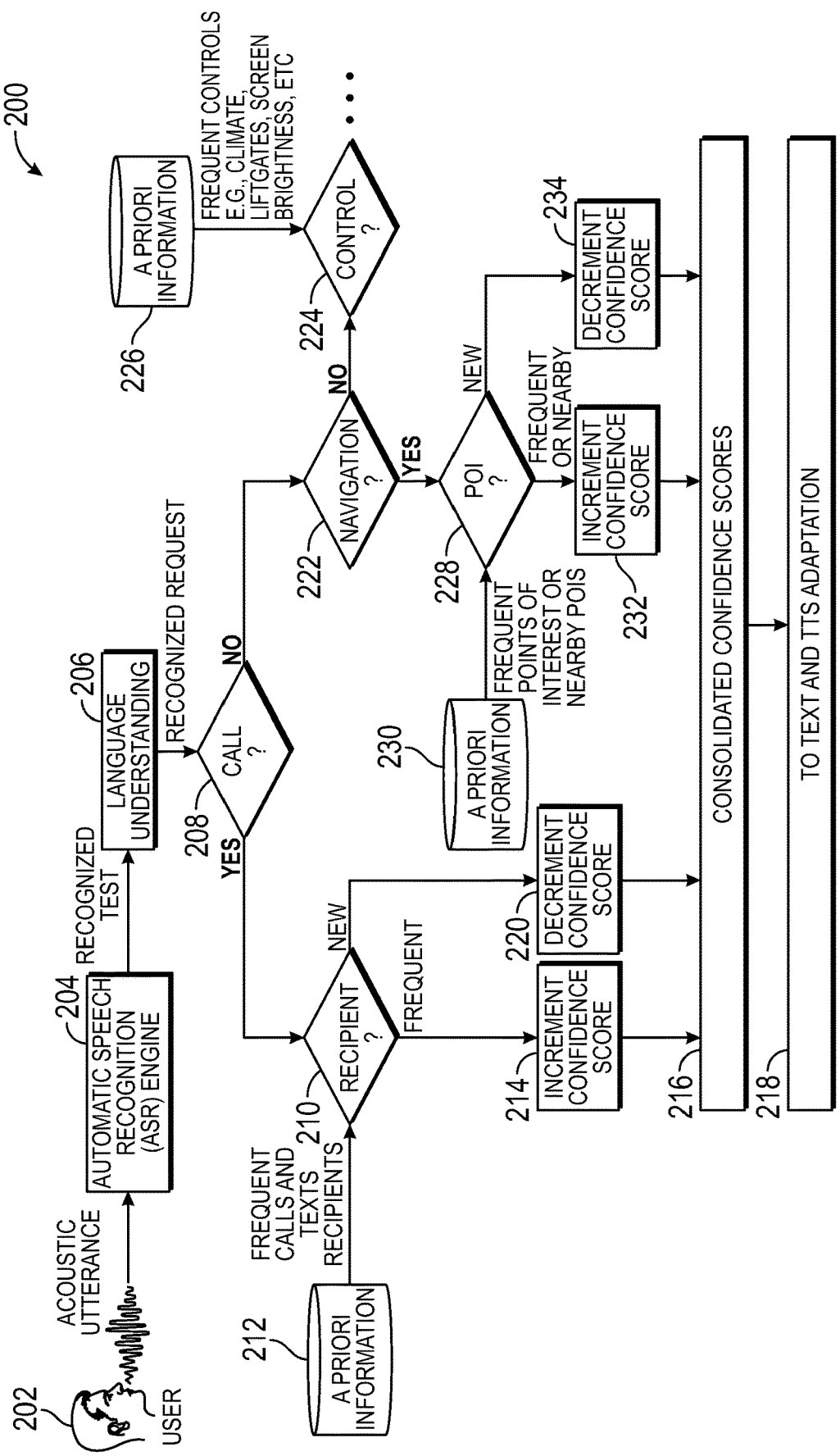
FIG. 4 is a flowchart of a method for text feedback

With reference to FIG. 4, the controller 34 is specifically programmed to execute a method 200 for text feedback. The method 200 begins at block 202. At block 2-2, the user of the vehicle 10 utters a command or a query (i.e., an acoustic utterance). In other words, the user of the vehicle 10 provides the user interface 23 an acoustic utterance. Then, the microphone 31 of the user interface 23 receives the acoustic utterance and transmits the acoustic utterance to the controller 34. The method 200 then proceeds to block 204.

At block 204, the ASR engine of the controller 34 receives and processes the acoustic utterance from the user. Subsequently, the ASR engine of the controller 34 determines the recognized test based on the acoustic utterance. The method 200 then proceeds to block 206.

At block 206, the controller 34 understands the language of the acoustic utterance to recognize the request (i.e., the recognized request). The method 200 then proceeds to block 208. At block 208, the controller 34 determines whether the user is trying to make a call based on the recognized request. If the user is trying to make a call, then the method 200 proceeds to block 210.

At block 210, the controller 34 determines who is the likely recipient of the call (i.e., the call recipient) based on the recognized request. To do so, the controller 34 accesses a database storing a priori information at block 212. The a priori information includes frequent calls and text recipients. If the call recipient is a frequent call recipient, then the method 200 proceeds to block 214.

At block 214, the controller 34 increases the confidence score for that particular recognized test. Then, the method 200 proceeds to block 216. At block 216, the controller 34 stores the confidence score determined in block 214 to obtain consolidated confidence scores. Then, the method 200 proceeds to block 218. At block 218, the controller 34 transmits the consolidated confidence scores to TTS engine for TTS adaptation, and the consolidated confidence scores are used for text adaptation as described above with respect to FIG. 3.

If the call recipient is determined to be a new recipient (i.e., not a frequent call recipient) at block 210, then the method 200 proceeds to block 220. At block 220, the controller 34 decreases the confidence score for that particular recognized test. Then, the method 200 proceeds to block 216.

If the controller 43 determines that user is not trying to make a call, then the method 200 proceeds to block 222. At block 222, the controller 34 determines whether the recognized request is related to navigation control command. If the recognized request is not related to navigation control, then the method 200 proceeds to block 224. At block 224, the controller 34 determines which control is the recognized request referring to. To do so, the controller 34 accesses a database storing a priori information at block 226.

If the recognized request is related to navigation control command at block 222, then the method 200 proceeds to block 228. At block 228, the controller 34 determines a point of interest (POI). In particular, the controller 34 determines that the user wants to reach a particular POI (i.e., the requested POI). To do so, the controller 34 accesses a database storing a priori information at block 230. The a priori information includes frequent POIs or nearby POIs. If the controller 34 determines that the requested POI is a frequent or nearby POI, then the method 200 proceeds to block 232. Besides usage history in terms of most frequent POIs, active contextual awareness shall also be incorporated. The nearest POI can be accentuated in terms of font, color and speech feedback. Besides usage history in terms of most frequent POIs, active contextual awareness will also be incorporated. The nearest POI can be accentuated in terms of font, color, and speech feedback.

At block 232, the controller 34 increases the confidence score for that particular recognized request. However, if the controller 34 determines that the requested POI is a new POI at block 228, then the method 200 proceeds to block 234. At block 234, the controller 34 decreases the confidence score for that particular recognized request. Then, the method 200 proceeds to block 216. The display 29 may adapt the text sizes and colors based on the estimated time of arrival (ETA) and/or distances to POIs.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for text feedback, comprising:
   receiving, by a controller, an utterance from a user;
   determining, by an automatic speech recognition engine of the controller, a plurality of speech recognition results based on the utterance from the user, wherein the speech recognition results include a plurality of probable commands; and
   determining, by the automatic speech recognition engine of the controller, a plurality of confidence scores for each of the plurality of speech recognition results;
   determining, by the controller, text characteristics for each of the plurality of probable commands as a function of the confidence scores for each of the plurality of speech recognition results;
   commanding, by the controller, a display to show text corresponding to each of the plurality of probable commands with the text characteristics determined by the controller;
   wherein the text characteristics includes a text size for each of the plurality of probable commands;
   wherein the plurality of speech recognition results includes a first speech recognition result and a second speech recognition result;
   wherein the plurality of confidence scores includes a first confidence score for the first speech recognition result and a second confidence score for the second speech recognition result;
   wherein the plurality of probable commands includes a first probable command corresponding to the first speech recognition result and a second probable command corresponding to the second speech recognition result;
   wherein the text includes a first text indicative of the first probable command and a second text indicative of the second probable command;
   wherein the text size for each of the plurality of probable commands includes a first text size of the first text and a second text size of the second text;
   wherein a difference between the first text size and the second text size is a text size difference;
   wherein a difference between the first confidence score and the second confidence score is a confidence score difference; and
   wherein the text size difference is proportional to the confidence score difference.

2. The method of claim 1, wherein the controller determines sizes for each of the plurality of probable commands based on the confidence scores as a function of a screen size of the display.

3. The method of claim 2, wherein the controller determines the sizes for each of the plurality of probable commands based on the confidence scores as a function of a number of speech recognition results determined by the automatic speech recognition engine of the controller.

4. The method of claim 3, wherein the controller determines the sizes for each of the plurality of probable commands based on the confidence scores as a function of a sum of the confidence scores for the plurality of speech recognition results.

5. The method of claim 1, wherein the text size is considered a final tuned text size, and the final tuned text size is determined using a following equation:

$$Stext = \frac{Sscreen}{N} \times \frac{Cscore}{\sum_{1}^{N} NBestScores/N}$$

where:
Stext is the final tuned text size;
Screen is a screen size;
N is a number of the speech recognition results;
$\Sigma_1^N$ NBestScores is a sum of confidence scores for all speech recognition results; and
Cscore is the confidence score of a target result.

6. The method of claim 1, wherein one of the text characteristics is a text color.

7. The method of claim 1, wherein one of the text characteristics is a color contrast with respect to a background color of a screen of the display.

8. The method of claim 1, further comprising commanding a speaker to provide voice feedback about the plurality of speech recognition results in response to determining the plurality of speech recognition results.

9. The method of claim 8, further comprising determining an audio volume of the voice feedback for each of the plurality of speech recognition results as a function of the plurality of confidence scores for each of the plurality of speech recognition results determined by the automatic speech recognition engine.

10. The method of claim 9, wherein the audio volume of the voice feedback for each of the plurality of speech recognition results is determined as a function of a maximum volume of the speaker and a maximum confidence score, and the audio volume of the voice feedback is considered a final tuned audio volume, the plurality of speech recognition results includes a target result, and the final tuned audio volume is determined using a following equation:

$$Vaudio = NBestScore/MaxScore \times MaxCSMVolume \times SNRAdjustCoeff$$

where:
Vaudio is the final tuned audio volume;
NBestScore is the confidence score of the target result;
MaxScore is a maximum value of the confidence scores;
MaxCSMVolume is a maximum audio volume of an infotainment radio of a vehicle; and
SNRAdjustCoeff is a coefficient to compensate for ambient noise.

11. A control system for a vehicle, comprising:
a user interface including a display and a microphone;
a controller in communication with the user interface, wherein the controller includes an automatic recognition engine and is programmed to:
receive an utterance from a user;
determine a plurality of speech recognition results based on the utterance from the user, wherein the speech recognition results include a plurality of probable commands; and
determine a plurality of confidence scores for each of the plurality of speech recognition results determined by an automatic speech recognition engine of the controller; and
determine text characteristics for each of the plurality of probable commands as a function of the confidence scores for each of the plurality of speech recognition results;
command the display to show text corresponding to each of the plurality of probable commands with the text characteristics determined by the controller;
wherein the text characteristics includes a text size for each of the plurality of probable commands;
wherein the plurality of speech recognition results includes a first speech recognition result and a second speech recognition result;
wherein the plurality of confidence scores includes a first confidence score for the first speech recognition result and a second confidence score for the second speech recognition result;
wherein the plurality of probable commands includes a first probable command corresponding to the first speech recognition result and a second probable command corresponding to the second speech recognition result;
wherein the text includes a first text indicative of the first probable command and a second text indicative of the second probable command;
wherein the text size for each of the plurality of probable commands includes a first text size of the first text and a second text size of the second text;
wherein a difference between the first text size and the second text size is a text size difference;
wherein a difference between the first confidence score and the second confidence score is a confidence score difference; and
wherein the text size difference is proportional to the confidence score difference.

12. The control system of claim 11, wherein the controller is programmed to determine sizes for each of the plurality of probable commands based on the confidence scores as a function of a screen size of the display.

13. The control system of claim 12, wherein the controller is programmed to the sizes for each of the plurality of probable commands based on the confidence scores as a function of a number of speech recognition results determined by the automatic speech recognition engine of the controller.

14. The control system of claim 13, wherein the controller is programmed to determine the sizes for each of the plurality of probable commands based on the confidence scores as a function of a sum of the confidence scores for the plurality of speech recognition results.

15. The control system of claim 11, wherein, the text size is considered a final tuned text size, and the final tuned text size is determined using a following equation:

$$Stext = \frac{Sscreen}{N} \times \frac{Cscore}{\sum_{1}^{N} NBestScores/N}$$

where:
Stext is the final tuned text size;
Screen is a screen size;
N is a number of the speech recognition results;
$\Sigma_1^N$ NBestScores is a sum of confidence scores for all speech recognition results; and
Cscore is the confidence score of a target result.

16. The control system of claim 11, wherein one of the text characteristics is a text color.

17. The control system of claim 11, wherein one of the text characteristics is a color contrast with respect to a background color of a screen of the display.

18. The control system of claim 11, wherein the controller is further programmed to command a speaker to provide voice feedback about the plurality of speech recognition results in response to determining the plurality of speech recognition results.

19. The control system of claim 18, wherein the controller is further programmed to determine an audio volume of the voice feedback for each of the plurality of speech recognition results as a function of the plurality of confidence scores for each of the plurality of speech recognition results determined by the automatic speech recognition engine.

20. The control system of claim 19, wherein the audio volume of the voice feedback for each of the plurality of speech recognition results is determined as a function of a maximum volume of the speaker and a maximum confidence score.

* * * * *